United States Patent
Noy et al.

(10) Patent No.: US 9,338,402 B2
(45) Date of Patent: May 10, 2016

(54) METHOD AND SYSTEM FOR USING MESH CONTROL FOR VIDEO CONFERENCING BRIDGES AND CASCADING CONFERENCES

(71) Applicant: Polycom, Inc., San Jose, CA (US)

(72) Inventors: Ami Noy, Nir Galim (IL); Uri Avni, Moshav Ram-On (IL); Koren Bergman, Moshav Kidron (IL)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/858,031

(22) Filed: Sep. 18, 2015

(65) Prior Publication Data

US 2016/0094804 A1    Mar. 31, 2016

Related U.S. Application Data

(60) Provisional application No. 62/057,898, filed on Sep. 30, 2014.

(51) Int. Cl.
*H04N 7/15* (2006.01)

(52) U.S. Cl.
CPC .................................. *H04N 7/152* (2013.01)

(58) Field of Classification Search
CPC ....................................................... H04N 7/152
USPC ....................................................... 348/14.09
See application file for complete search history.

(56) References Cited

U.S. PATENT DOCUMENTS

| 8,228,363 B2 * | 7/2012 | Halavy | H04N 7/152 38/14.08 |
| 2012/0236111 A1 * | 9/2012 | Halavy | H04N 7/152 348/14.09 |

* cited by examiner

*Primary Examiner* — Creighton Smith
(74) *Attorney, Agent, or Firm* — Blank Rome, LLP

(57) ABSTRACT

A videoconferencing system allows a distributed group of separately addressable multipoint controller signaling layer and multipoint controller application layer units to be logically combined for the purpose of managing a videoconference with a plurality of endpoints. In some embodiments, a primary multipoint controller signaling layer unit may identify other multipoint controller signaling layer units and multipoint controller application layer units to handle requests for joining an ongoing videoconferencing session, routing such requests to the other multipoint controller signaling layer units and multipoint controller application layer units as needed.

20 Claims, 4 Drawing Sheets

METHOD AND SYSTEM FOR USING MESH CONTROL FOR VIDEO CONFERENCING BRIDGES AND CASCADING CONFERENCES

CROSS REFERENCE TO RELATED APPLICATIONS

This application claims benefit to U.S. Provisional No. 62/057,898 filed Sep. 30, 2014 entitled "Method and System for Using Mesh Control for Video Conferencing Bridges and Cascading Conferences," which is hereby incorporated in its entirety.

FIELD OF THE DISCLOSURE

The present disclosure relates to videoconferencing and more particularly to the field of establishing and controlling of a video conference session over a plurality of multipoint control units (MCU).

BACKGROUND

As applications and services migrate to Internet Protocol (IP) networks at a remarkable rate, and with the growth of the variety of multimedia conferencing equipment, more and more people use multimedia conferencing as their communication tool. Today multimedia conferencing communication can be carried using a plurality of conferencing techniques. Some examples of conferencing techniques include the AVC multimedia conferencing method and the media relay conferencing method. (AVC stands for Advanced Video Coding.) In this disclosure, the terms multimedia conference, video conference (with or without content), and audio conference may be used interchangeably and the term video conference can be used as a representative term of them.

Usually an AVC multipoint conference between three or more participants requires an AVC Multipoint Control Unit (MCU). An AVC MCU is a conference controlling entity that is typically located in a node of a network or in a terminal that receives several channels from a plurality of endpoints. According to certain criteria, the AVC MCU processes audio and visual signals and distributes them to each of the participating endpoints via a set of connected channels. Examples of AVC MCUs include the RMX® 2000, which are available from Polycom, Inc. (RMX is a registered trademark of Polycom, Inc.) A terminal in the AVC communication method, which may be referred to as an AVC endpoint (AVCEP), is an entity on the network capable of providing real-time, two-way audio and/or audio visual communication with another AVCEP or with the MCU. A more thorough definition of an AVCEP and an MCU can be found in the International Telecommunication Union ("ITU") standards, such as but not limited to the H.320, H.324, and H.323 standards, which can be found at the ITU Website: www.itu.int.

A common MCU, referred to also as an AVC MCU, may include a plurality of audio and video decoders, encoders, and media combiners (audio mixers and/or video image builders). The MCU may use a large amount of processing power to handle audio and video communication between a variable number of participants (AVCEPs). The communication can be based on a variety of communication protocols and compression standards and may involve different types of AVCEPs. The MCU may need to combine a plurality of input audio or video streams into at least one single output stream of audio or video, respectively, that is compatible with the properties of at least one conferee's AVCEP to which the output stream is being sent. The compressed audio streams received from the endpoints are decoded and can be analyzed to determine which audio streams will be selected for mixing into the single audio stream of the conference. In the present disclosure, the terms decode and decompress can be used interchangeably.

A conference may have one or more video output streams wherein each output stream is associated with a layout. A layout defines the appearance of a conference on a display of one or more conferees that receive the stream. A layout may be divided into one or more segments where each segment may be associated with a video input stream that is sent by a certain conferee via the conferee's AVCEP. Each output stream may be constructed of several input streams, resulting in a continuous presence (CP) image. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

The second type of communication method is Media Relay Conferencing (MRC). In MRC, a Media Relay MCU (MRM) receives one or more streams from each participating Media Relay Endpoint (MRE). The MRM relays to each participating endpoint a set of multiple media streams received from other endpoints in the conference. Each receiving endpoint uses the multiple streams to generate the video CP image, according to a layout, as well as mixed audio of the conference. The CP video image and the mixed audio are played to MRE's user. An MRE can be a terminal of a conferee in the session that has the ability to receive relayed media from an MRM and deliver compressed media according to instructions from an MRM. A reader who wishes to learn more about an example of an MRC, MRM, or an MRE is invited to read the related patent application, which was published and has the U.S. Pat. No. 8,228,363 and U.S. patent application Ser. No. 13/487,703 that are incorporated herein by reference. As used herein, the term endpoint may represent also an MRE.

In some MRC systems, a transmitting MRE sends its video image in two or more streams; each stream can be associated with different quality level. The qualities may differ in frame rate, resolution and/or signal to noise ratio (SNR), etc. In a similar way each transmitting MRE may sends its audio in two or more streams that may differ from each other by the compressing bit rate, for example. Such a system can use the plurality of streams to provide different segment sizes in the layouts, different resolution used by each receiving endpoint, etc. Further, the plurality of streams can be used for overcoming packet loss.

Today, MRC becomes more and more popular. Many video conferencing systems deliver a plurality of quality levels in parallel within one or more streams. For video, for example, the quality can be expressed in number of domains, such as temporal domain (frames per second, for example), spatial domain (HD versus CIF, for example), and/or in quality (sharpness, for example). Video compression standards, for example, that can be used for multi-quality streams are H.264 AVC, H.264 annex G (SVC), MPEG-4, etc. More information on compression standards such as H.264 can be found at the ITU website www.itu.int, or at www.mpeg.org.

H.323 is an ITU standard. A reader who wishes to learn more about video conferencing standards and protocols is invited to visit the ITU website, www.itu.int, or the Internet Engineering Task Force (IETF) website, www.ietf.org. AVC multipoint conference systems, MRCs, MCUs, AVC endpoints, MREs, web conferencing clients, and virtual meeting rooms are well known to a person with ordinary skill in the art and have been described in many patents, patent applications, and technical books. As such, these will not be further described. The following are examples of patents and patent applications that describe videoconferencing systems: U.S. Pat. Nos. 6,496,216; 6,757,005; 7,174,365; 7,085,243; 8,411,595; 7,830,824; 7,542,068; 8,340,271; 8,228,363; U.S. patent application Ser. No. 13/869,781.

In the two types of communication methods, the AVC and the MRC, a central entity is needed for handling signaling and the media streams (audio, video), an MCU or an MRM, respectively. In order to establish a video conferencing system, an endpoint can call a central unit such as an MCU or a virtual MCU. A virtual MCU (VMCU) can be a network device, a control server for example, that can communicate with a plurality of MCUs and a plurality of endpoints. A user initiating a reserved conference or an ad hoc conference can communicate with the VMCU. If sufficient resources are available on one or more MCUs, the reservation is made and connection numbers are assigned. When the time for the conference arises, one or more MCUs are assigned to the conference and the participants are then connected to the conference. A reader who wishes to learn more about a VMCU is invited to read patents and patent applications such as U.S. Pat. Nos. 7,174,365; 7,492,730; and many others. An example of a VMCU can be a product such as a DMA sold by Polycom Inc.

After establishing the session, each endpoint sends its media streams to an MCU or an MRM. The MCU or the MRM processes the media stream according to the type of the communication methods and transfers the relevant streams to receiving endpoints. As used herein, the term MCU can be used as a representative term for an MRM and an AVC MCU.

An MCU may comprise a Multipoint Controller (MC) and a Multipoint Processor (MP). The MC can be a packet switched network entity that is located at the network that provides the signaling and control of three or more terminals participating in a multipoint conference. An example of packet switched network can be an IP network. The MC may also connect two terminals in a point-to-point conference, which may later develop into a multipoint conference. The MC provides capability negotiation with all terminals to achieve common levels of communications, and may also control conference resources. However, the MC does not perform mixing or switching of audio, video, and data. The MP is a media entity on the network providing the centralized processing of audio, video, and/or data streams in a multipoint conference.

The MP provides the media processing such as decoding, mixing, composing, encoding, switching, routing, or other processing of media streams under the control of the MC. The MP may process a single media stream or multiple media streams depending on the type of conference supported. A single MC can control a plurality of MPs.

If there are no available resources for establishing and controlling a new video conferencing session, a common video conferencing system can reject the session, limit the amount of participants, use resources of two or more MCUs and connect the MCUs in cascading, or use two or more MPs under the control of a single MC. Any of those solution result in reduced quality of experience for the conferees that participant in the session. The quality of experience can be reduced due to additional decoding/encoding cycles in the two or more cascading MCUs; or by presenting a first CP video image, which was created and transmitted from a first MCU to a second MCU, in a single segment of the second CP video image created by the second MCU and presented to conferees that are connected to the second MCU. Last but not least, a single signaling and controlling entity creates a single point of failure: if the central control unit fails, the entire system collapses.

SUMMARY

The deficiencies of connecting a group of MCUs in order to serve a plurality of conferees as it is described above are not intended to limit the scope of the inventive concepts of the present disclosure in any manner. The deficiencies are presented for illustration only. The disclosure is directed to a novel architecture of an MC. An example architecture of a novel MC can comprise two layers, a first layer and a second layer. The first layer can be referred as a signaling layer, an MC signaling (MCS) layer. The second layer can be referred as an MC application (MCA) layer. The MCS layer can be used for handling the signaling communication between the MCU and the participating endpoints, while the MCA layer can handle the establishing of the conference and the controlling of the conference.

Some embodiments of the novel technique are configured to operate in a group of a plurality of MCUs. Each MCU can have an MC and MP. The MC comprises two layers. Each MC layer, which is configured as an MCS and an MCA, can be configured to act as a complex IP entity that can communicate with one or more MCA and MCS layers of the same and other MCs that belong to the same group, thus enabling cross-MC configuration, in which a video conference session gets MCS services from one MC while getting MCA services from another MC of that group of MCSes, MCAs and MPs. Further, in some embodiments, each MC, from the group of the MCs, can control each MP from a group of a plurality of MPs that belong to the same group of MCSes, MCAs, and MPs. The complex IP entity may have one IP address for an multipoint controller signaling layer and one IP address for an MCA.

In one embodiment, a primary-secondary configuration can be used. In a primary-secondary configuration, one of the MCs can be configured as a primary MC while the other MCs are configured as secondary MCs. In the disclosure, the primary MC can be referred as MC1 and its layers can be referred to as MCS1 and MCA1, while the other, secondary MCs can be referred to as MC2, and accordingly their layers are referred to as MCS2 and MCA2. In another alternative embodiment, only the MC1 has an MCS module that acts as MCS1, while the other MCs may not have an MCS layer. In yet other alternative embodiments, each MC type (MC1 as well as MC2) may have an MCS layer but only MCS1 is active while the MCS2 of the other one or more MC2s are not active. Endpoints, which are served by the group of a plurality of MCUs that uses a primary-secondary configuration of MCs, can be configured to call the MCS1 in order to establish or to join a video conferencing session.

During a power-on sequence, an example of MCS1 can be configured to broadcast an MCS1 Hello notification informing one or more active MCA1 and MCA2 about the MCS1 IP address and that the MCS1 is ready for accepting requests. In response, the active MCA1s or MCA2s can respond with their IP addresses and with or without their capabilities. In a similar way, each MCA1 or MCA2 can be configured to broadcast an MCA Hello notification informing the active MCS1 and other MCA2 or MCA1 about its IP address, with or without its capabilities, and that it is ready to serve as MCA. In response, the active MCS1s and MCAs can send their IP addresses. In some embodiments, the responses can include the capabilities of the responder. Some examples of MCS1 and MCA1 can create a resources table that comprises information about the IP address and the capacities of the active MCA1s, MCA2s, and MCS2s.

The available resources of each entity can be updated each time a change occurs. A change can be a new session, an end of session, an additional conferee, etc. The change can be broadcast to MCSes, MCAs, and MPs that belong to the same group.

In other example embodiments, the responses may comprise the IP addresses of the responder without its resources. Such example embodiments may create and use a mapping table with the IP addresses of each responder. In some embodiments, the responses can include an indication about association between the MCS and the MCA. In such embodiments, the resource table or the mapping table can have an indication on the association between the one or more MCSes and MCAs.

Some example embodiments may not have a resources table and/or mapping table. Instead, a broadcasting/multicasting technique can be used. Each time an endpoint contacts an MCS and requests to join a certain conference or to establish a video conference, then the called MCS may broadcast/multicast a query to all other MCSes asking whether the requested conference has been already initiated and conducted by one of the MCSes and/or MCAs and requesting their available resources. Based on the response, the called MCS determines how to proceed: whether to handle the call by itself and its corresponding MCA, or respond to the request by instructing the requesting endpoint to pass the call to the appropriate MCS and/or MCA. Passing the call can be done by "call forward" in H.323 or by "call transfer" or "call refer" in SIP, for example. (SIP stands for Session Initiation Protocol. A reader who wishes to learn more about SIP is invited to visit the IETF web site www.ietf.org.) Call forward, call transfer, and call refer are well known to a person with ordinary skill in the art and will not be further described. As used herein, the terms forward, transfer, and refer can be used interchangeably. The term forward can be used as a representative term for those three terms.

Other embodiments may use a mesh configuration. In a mesh configuration, each MC can have active MCS and MCA layers; each layer is configured as an IP entity. During a power-on sequence, an example of mesh MCS, can be configured to broadcast an MCS Hello notification informing one or more other active MCS or active MCAs, about that MCS IP address and that is ready for accepting requests. In response, the active MCSes or MCAs can respond with their IP addresses with or without their capabilities. In a similar way, each MCA can be configured to broadcast an MCA Hello notification informing the active MCS and/or MCA about its IP address, with or without its capabilities, and that it is ready to serve as MCA. In response, the active MCSes and MCAs can send their IP addresses. In some embodiments, the responses can include the capabilities of each MCS or MCA. Some examples of MCSes and MCAs can create a resources table that comprises information about the IP address and the available capacities of the active MCSes and MCAs.

In a mesh configuration, each endpoint (EP) can be configured to call one or more MCS, from the group of MCSes, MCAs, and MPs, in order to establish or join a videoconferencing session. In response to receiving an EP request, the relevant MCS can request its corresponding MCA to determine which MCA can handle the call and accordingly respond to the request. In embodiments in which a resource table is used, then the corresponding MCA may check the resource table in order to decide how to proceed. The decision can be based on several criteria, such as but not limited to whether the conference is already active and by which MCA; or based on available resources, or cost, latency, etc.

In some embodiments of the novel technique, an active MCS can be configured to respond to a request from an EP to establish or join a conferencing session, by checking with its corresponding MCA whether such a session is already active and managed by the corresponding MCA. If so, then the corresponding MCA can establish the requested session or add the requesting endpoint to the relevant active session. If not, the MCA can broadcast the request to the other MCAs and wait to get their answer.

The decision which MCA will handle the call is returned to the MCS that received the request from the requesting EP. Based on the decision, the MCS can respond to the requesting EP with a few alternatives. In some embodiments, the MCS may instruct the requesting EP to forward the call to the MCS that corresponds with the selected MCA. The call forward can be associated with the IP addresses of the selected MCS. Other embodiments of MCS may remain connected to the requesting EP and operate in a similar way to back-to-back operation, or proxy operation, with the MCS that is corresponded with the selected MCA. In some alternate embodiments, the MCS may remain connected to the requesting EP and communicate directly with the selected MCA. In an alternate embodiment, a conference can be established and conducted by one MCU, in which case the entire conference (the entire session) may be moved to another MCU. Back-to-back operation is well known to a person with ordinary skill in the art and will not be further described.

In a mesh configuration, the novel technique does not have a single point of failure. Further, embodiments of secondary MCS in a primary-secondary configuration can be configured to use a "keep alive" technique in order to determine whether the primary MCS is active or not. When a secondary MCS determines that the primary MC has failed, the secondary MCS can be configured to automatically switch to a primary one and send the hello message. In addition, each EP that can use the services of the group of MCSes, MCAs, and MPs can have a list of available MCSes so that each one of the EPs can call an MC other than the main one, if the main one does not reply.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Embodiments of the present invention will be understood and appreciated more fully from the following detailed description, taken in conjunction with the drawings in which.

DETAILED DESCRIPTION OF EMBODIMENTS

Turning now to the figures, in which like numerals represent like elements throughout the several views, embodiments of the present disclosure are described. For convenience, only some elements of the same group may be labeled with numerals. The purpose of the drawings is to describe embodiments and not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on one or more computer readable media such as a read/write hard disc, CDROM, Flash memory, ROM, or other memory or storage, etc. In order to execute a certain task a software program may be loaded to an appropriate processor as needed. In the present disclosure the terms task, method, and process can be used interchangeably.

Figure 1:
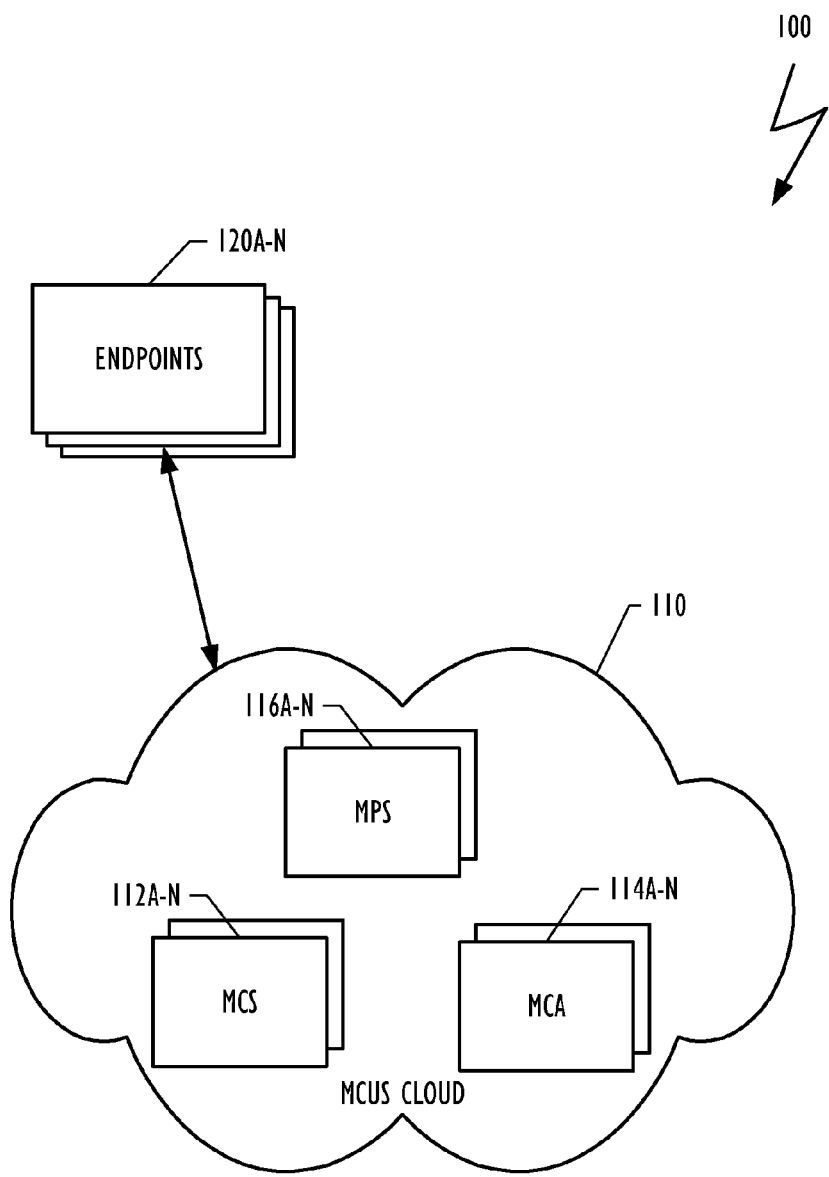
FIG. 1 illustrates a logical view of an environment in which embodiments of the novel techniques operates.

FIG. 1 illustrates a novel multimedia conferencing system 100, according to an example embodiment of the present disclosure. System 100 can be illustrated as a video conferencing system that can comprise a network 110, a group of a plurality of MCSes 112A-N, a plurality of MCAs 114A-N, a plurality of MPs 116A-N, and a plurality of EPs 120A-N. Network 110 can be but is not limited to a packet switched network, such as IP network, for example. The multimedia communication over the network can be based on communication protocols such as but not limited to H.323, SIP, etc. and may use media compression standards such as but not limited to H.263, H.264, VP8, G.711, G.719, or Opus, for example.

The architecture that is illustrated by FIG. 1 is a distributed architecture, in which each network entity, MCS 112A-N, MCA 114A-N, and MP 116A-N is illustrated as a separate entity. In other embodiments, an MCS and an MCA can be assembled in one entity, such as in a Multipoint Controller (MC). In yet another embodiment, the MCS, MCA, and the MP can be assembled into one entity such as an MCU. The MCS 112A-N and the MCA 114A-N can be engaged as pairs. Each pair can comprise an MCS 112A-N and a corresponding MCA 114A-N. In MC or an MCU architecture, each pair of an MCS 112 and a corresponding MCA 114 can be located in a single entity (MC or MCU respectively).

An example of a MCS 112, MCA 114, MP 116, and EP 120 may comprise one or more processors, a computer readable medium such as a read/write hard disc, CDROM, Flash memory, ROM, or other memory or storage devices, etc. Software of a logical module may be embodied on one or more of the computer readable media. In order to execute a certain task, a software program may be loaded to an appropriate processor as needed.

An MCS 112 can be configured to handle the signaling communication between a common MC or an MCU and a plurality of participating EPs 120A-N. An MCA 114A-N can be configured to handle the establishing of the conference and control of the conference. An MP 116A-N can be configured to handle the media processing such as decoding, mixing, composing, encoding, switching, routing, or other processing of media streams under the control of the MCA 114A-N. The MP 116A-N may process a single media stream or multiple media streams depending on the type of conference supported. A single MCA 114A-N can control a plurality of MPs 116A-N.

The common signaling and control operations of an MC (MCS 112A-N and its corresponding MCA 114A-N) as well as common media processing of MP 116A-N are well known to a person with ordinary skill in the art and will not be further disclosed. Readers who wish to learn more about common signaling, control, and media processing of videoconferencing are invited to read protocols and standards such as H.323 or SIP, H.264 AVC, H.264 annex G (SVC), MPEG-4, etc.

In addition to common signaling of a videoconferencing, example embodiments of an MCS 112A-N and an MCA 114A-N can be configured to operate in a group of a plurality of MCSes 112A-N, MCAs 114A-N and MPs 116A-N. In one embodiment, a primary-secondary configuration can be used. In a primary-secondary configuration, a pair of MCSes 112A-N and a corresponding MCA 114A-N can be configured as a primary pair and can be referred as MCS1 and MCA1. The other pairs can be configured as secondary pairs and can be referred as MCS2 and MCA2.

In a primary-secondary architecture, the MCS1 can be active while the one or more MCS2s are not active. In an alternate embodiment of a primary-secondary architecture (not shown in the drawings), the video conferencing system may comprise a single MCS 112 that act as MCS1 and a plurality of MCAs 114A-N. One of those MCAs, the corresponding MCA of MCS1, can be configured as MCA1 while the others are configured as MCA2s. EPs 120A-N, which are served by the primary-secondary videoconferencing system, can be configured to call the MCS1 in order to establish or to join a video conferencing session.

Other embodiments of the videoconferencing group of MCSes, MCAs, and MPs may use a mesh configuration. In a mesh configuration, each MCS 112A-N is active. Each MCS 112A-N and each MCA 114A-N can be configured as an IP entity. During a power-on sequence, an example of mesh MCS can be configured to broadcast an MCS Hello notification informing one or more other mesh MCSes 112A-N or MCAs 114A-N about the broadcasting mesh MCS IP address and that is ready for accepting requests. In response, the operating mesh MCSes 112A-N or MCAs 114A-N can respond with their IP addresses with or without their capabilities. In a similar way, each MCA 114A-N can be configured to broadcast an MCA Hello notification informing the mesh MCSes 112A-N or MCAs 114A-N about its IP address, with or without its capabilities, and that the MCA 114A-N is ready to serve as MCA. In response, the operating mesh MCSes 112A-N or MCAs 114A-N can send their IP address. In some embodiments, the responses can include the capabilities of each of the operating mesh MCSes or MCAs. In the disclosure the terms MCS and mesh MCS can be used interchangeably and the term MCS can be used as the representative term.

Some examples of mesh MCSes 112A-N or MCAs 114A-N can create a resources table that comprises information about the IP address and the available capacities of the operating mesh MCSes 112A-N, and MCAs 114A-N. Other embodiments of MCSes 112A-N or MCAs 114A-N can create a mapping table that comprises information about the IP address of the operating entities. More information on the operation of the MCS 112A-N and MCA 114A-N is disclosed below in conjunction with FIGS. 2, 3 and 4.

Endpoints 120A-N are terminals on the network 110, capable of providing real-time, two-way signaling/control and audio/visual/data communication with other terminals or with an MCU. An EP 120A-N may provide any combination of speech, data, and video communications. A videoconferencing EP typically comprises a display module on which video images from one or more remote sites may be displayed. Example EPs 120A-N may include the POLYCOM® VSX® and HDX® series, each available from Polycom, Inc. (POLYCOM, VSX, and HDX are registered trademarks of Polycom, Inc.).

The plurality of EPs 120A-N may be connected to the video conferencing group of MCSes, MCAs, and MPs via the network 110. Each EP 120A-N can be configured to communicate with the plurality of MCSes 112A-N, MCAs 114A-N and MPs 116A-N by using common video conferencing protocols such as but not limited to H.323, SIP, etc. A gatekeeper or a proxy can be used in order to connect the EPs 120A-N to the group of MCS, MCAs, and MPs.

The communication between MCSes 112A-N, MCAs 114A-N, and MPs 116A-N can be based on IP. The communication can be based on a protocol that comprises new commands, queries, and status notifications. The novel protocol may comprises messages such as Hello, queries about available resources, queries about running videoconferences, etc. Some of those queries and messages are disclosed below in conjunction with FIGS. 3 and 4.

Figure 2:
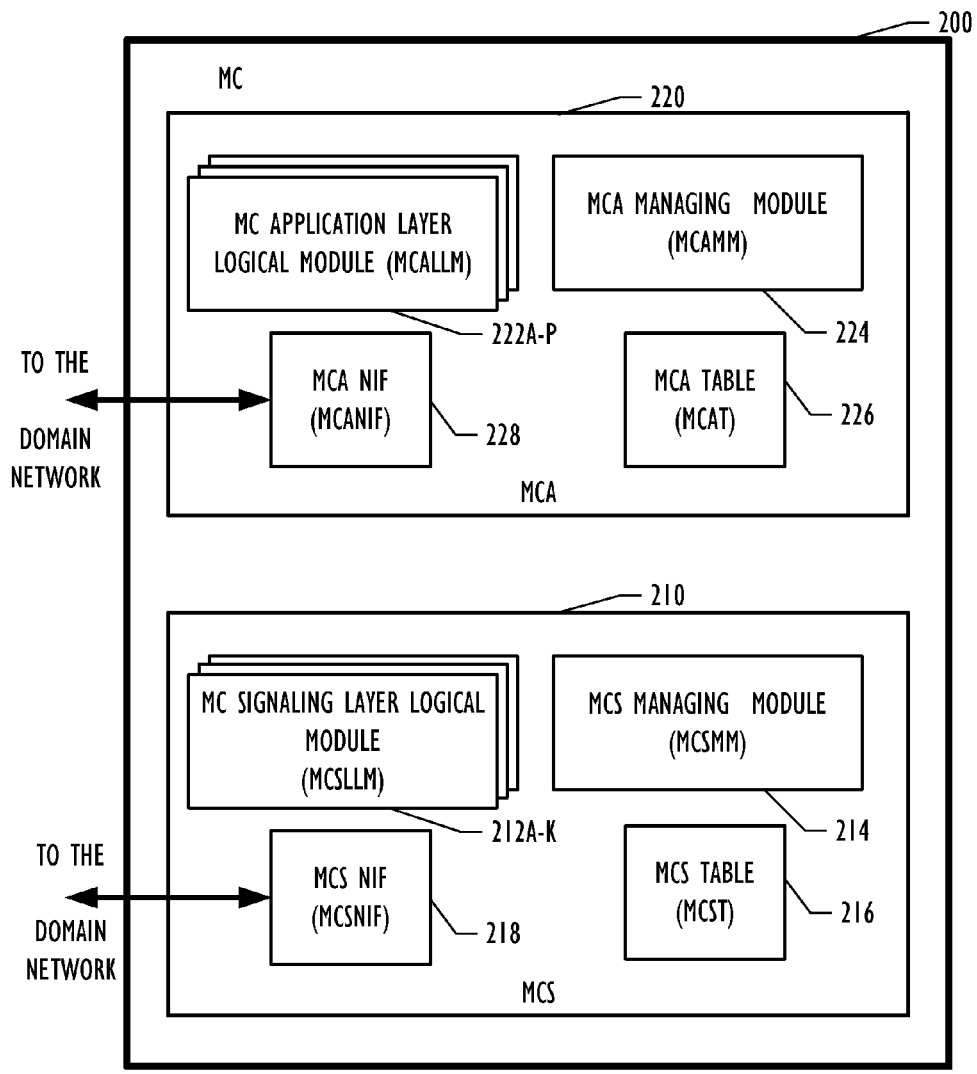
FIG. 2 depicts a block diagram with relevant elements of an embodiment of an MC.

FIG. 2 depicts a block diagram with relevant elements of an example embodiment of an MC 200, which comprises the two layers, media signaling layer MCS 210 and media application layer MCA 220. An example embodiment of an MC 200 serve as an intermediate control unit that is configured to operate in a videoconferencing system capable of managing a group of a plurality of multipoint control units (MCs and MPs) by using a mesh cascading technique. In one embodiment of an MC 200, the two layers MCS 210 and MCA 220 are embedded in a single entity MC 200, as in FIG. 2. In other embodiments, the two layers can reside as two separate entities, MCS 112A-N and MCA 114A-N, as in FIG. 1. In some embodiments, the number of MCAs can be larger than the number of MCSes. A single MCS can serve a plurality of MCAs.

One embodiment of an MCS 210 may comprise one or more processors, one or more computer readable media such as a read/write hard disc, CDROM, Flash memory, ROM, or other memory or storage devices, etc. Software of a logical module may be embodied on one or more of the computer readable medium. In order to execute a certain task, a software program may be loaded to an appropriate processor as needed. MCS 210 may comprise an MCS network interface module (MCSNIF) 218; a plurality of MCS signaling layer logical modules (MCSLLM) 212A-K, one per each EP that participate in a conference that is associated with that MCS 210; an MCS managing module (MCSMM) 214; and an MCS table (MCST) 216.

An MCSNIF 218 may obtain and transmit videoconferencing signaling and control communications from/to a plurality of EPs 120A-N, a plurality of MCSes 112A-N, a plurality of MCAs 114A-N and MP 116A-N via at least one network 110. The MCSNIF 218 may process the communication according to one or more communication standards (e.g. H.323, Session Initiation Protocol (SIP), etc.). Information about signaling and control can be found in the ITU website (information about H.323) or in the IETF Network Working Group website (information about SIP).

An MCSNIF 218 can be configured to route signaling and control information, which is transferred between the EP 120A-N and the MCS 112A-N during a video conferencing session to an MCSLLM 212A-K that was assigned to that EP. In some embodiments, routing the information toward the appropriate MCSLLM 212A-K can be based on information that is stored in MCS table 216. Signaling and control information regarding establishing or joining a video conferencing session can be transferred toward the MCSMM 214. In addition, MCS Hello notification and MCA Hello notification communication can be transferred to/from the MCSNIF 218 and the MCSMM 214.

An MCSMM 214 may be configured to manage the operation of MCS 210. During a power-on sequence, the MCSMM 214 can allocate resources and create the MCS table 216. Each entry in the MCS table 216 can be associated with an MCS 112A-N or an MCA 114A-N. A first column in the table can be allocated for the address of the relevant MCS or MCA. In some embodiments, one or more additional columns can be allocated to store information regarding the resources that are available in the relevant MCS or MCA. Other embodiments of a MCS 210 may not include the MCS table 216. In such embodiments, the MCSMM 214 can be configured to respond to a request to establish or join a video conferencing session by broadcasting information regarding the request to the other MCSes 112A-N and according to the responses can determine which MCS can be assigned to respond to the request.

After creating the MCS table 216, MCSMM 214 can be configured to broadcast/multicast the MCS Hello notification. In a primary-secondary configuration, the MCS Hello notification can include an indication on the status of that MCS 210. A primary MCS can send an MCS1 Hello notification; a secondary one can send an MCS2 Hello notification. In addition, the MCSMM 214 may be configured to obtain, via an MCSNIF 218, the responses to the Hello notifications. Based on each response, the MCSMM 214 may update the relevant entry in the MCS table 216 that is associated with the responding MCS or MCA. In some embodiments, the response can point to the address of each MCS or MCA. In such an embodiment, the table 216 can be referred as a MCS mapping table. In other embodiments, the response can comprise information regarding the available resources in the relevant unit. In such embodiments, the MCS table 216 can be referred as an MCS resources table. The network address can depend on the type of network 110. If the network is based on IP, the address can be an IP address. If the network is a Time Division Multiplexing (TDM) network, then the address can be a time slot. For an Ethernet network, the address can be an Ethernet address, etc.

At the end of the power-on sequence, an example of an MCSMM 214 can be configured to manage the signaling and control communication of an EP that is wishes to join or establish a video conferencing session. The MCSMM 214 can be configured to determine which MCS 112A-N and/or MCA 114A-N can respond to the request and accordingly can route the request. If the request can be handled by that MCS, the MCSMM 214 can allocate or create an MCSLLM 212A-K for handing the common signaling of that EP in the requested videoconferencing session. The MCSNIF 218 can be informed about the allocated MCSLLM 212A-K. This information can be used for routing following packets to the allocated MCSLLM 212A-K. Handling common signaling of a video conferencing session is well known to a person with ordinary skill in the art and therefore the MCSLLM 212A-K will not be further disclosed. More information on the operating of MCS 210 is disclosed below in conjunction with FIG. 3.

An example embodiment of MCA 220 may comprise one or more processors, computer readable media such as a read/write hard disc, CDROM, Flash memory, ROM, or other memory or storage devices. Software of a logical module may be embodied on one or more of the computer readable media. In order to execute a certain task, a software program may be loaded to an appropriate processor as needed. MCA 220 may comprise an MCA network interface module (MCANIF) 228; a plurality of MC Application layer logical modules (MCALLM) 222A-P, one per each conference that is associated with that MCA 220; an MCA managing module (MCAMM) 224; and MCA table (MCAT) 226.

During power-on sequence, the MCANIF 228 may transfer MCS Hello notifications and MCA Hello notifications to/from the associated MCS 112A-N or MCA 114A-N or MP 116A-N from/to the MCAMM 224. Information regarding establishing (call setup) or joining a video conferencing session can be routed by the MCANIF 228 from/to the MCS 210 or EPs 120A-N to/from the MCAMM 224. The information during a call setup or adding a new conferee can comprise requests from the corresponding MCS 210 to handle a new session or adding a new conferee to an existing conference, questions from other MCAs 114A-N that are searching for capabilities or existing conferences, etc.

During an ongoing video conferencing session, an example MCANIF 228 can be configured to route videoconferencing application information chunks to/from relevant EPs, the MCS 210, or MPs 116A-N from/to the MCALLM 222A-P. The videoconferencing application information and control chunks may comprise audio energy indications, speaker selection, layout decisions, selecting of audio streams to be mixed, etc. The appropriate MCALLM 222A-P can be the one that was assigned to handle the application information and control chunks of that video conferencing session. In some embodiments, routing the information toward the appropriate MCALLM 222A-P can be based on information that is stored in MCA table 226.

An MCAMM 224 may be configured to manage the operation of MCA 220. During a power-on sequence, the MCSMM 214 can allocate resources and create the MCA table 226. Each entry in the MCA table 226 can be associated with an MCS 112A-N or MCA 114A-N. A first column in the table can be allocated for the address of the relevant MCS or MCA. In some embodiments, one or more additional columns can be allocated to store information regarding the resources that are available in the relevant MCS or MCA. In other embodiments, the MCA 220 may not comprise the MCA table 226. In such embodiments, the MCAMM 224 can be configured to respond to a request to establish or join a video conferencing session by broadcasting information regarding the request to the other MCAs 114A-N and according to the responses can determine which MCS or MCA can be assigned to respond to the request.

After creating the MCA table 226, MCAMM 224 can be configured to broadcast/multicast the MCA Hello notification. In a primary-secondary configuration, the MCA Hello notification can include an indication of the status of that MCA 220. A primary MCA can send an MCA1 Hello notification; a secondary MCA can send an MCA2 Hello notification. In addition, the MCAMM 224 may be configured to obtain, via MCANIF 228, the responses to the Hello notifications. Based on each response, the MCAMM 224 may update the relevant entry in the MCA table 226 that is associated with the responding MCS or MCA. In some embodiments, the response can point to the address of each MCS or MCA. In such embodiment the table 226 can be referred as a MCA mapping table. In other embodiments, the response can comprise information regarding the available resources in the relevant unit. In such embodiments, the MCA table 226 can be referred as MCA resources table. The network address can depend on the type of network 110. If the network is based on IP, the address can be an IP address. If the network is a TDM network, then the address can be a time slot. For an Ethernet network, the address can be an Ethernet address, etc.

At the end of the power-on sequence, an example MCAMM 224 can be configured to manage the videoconferencing application task for a video session. If an EP wishes to join or establish a video conferencing session, the MCAMM 224 can be configured to respond to obtained queries from its corresponding MCS 112 or one of its colleague MCAs 114A-N. If the query was received from the corresponding MCS, then MCAMM 224 can be configured to check if the request is related to an existing conference. If yes, then the available resources for adding the conferee are checked. If the request can be handled by that MCA, the MCAMM 224 can inform an MCALLM 222A-P that has been already assigned to the existing conference, or allocate or create a new MCALLM 222A-P for handing the common application task for the requested new videoconferencing session. The MCANIF 228 can be informed about the allocated MCALLM 222A-P. This information can be used for routing following packets of that session to the allocated MCALLM 222A-P. The common application task of video conferencing session is well known to a person with ordinary skill in the art and therefore the MCALLM 222A-P will not be further disclosed.

If there are not enough resources or the session is not handled by that MCA, then the MCAMM 224 can send a query to the MCAMM 224 of its colleague MCAs 114A-N. If one of the colleague MCAs 114A-N can respond positively to the MCAMM 224's request, then the MCAMM 224 can send an indication to the MCSMM 214 of its corresponding MCS to forward the request to an MCS 112A-N that corresponds to the MCA that responds positively.

In some cases, the entire conference can be moved. In some embodiments of an MC 200, the corresponding MCS may remain connected to the requesting EP and operate in a similar way to back-to-back operation with the MCS that corresponds to the selected MCA or proxy methods. In alternate embodiments, in a primary-secondary architecture for example, the MCS that received the request from the EP (the primary MCS, MCS 1, for example) may remain connected to the requesting EP and communicate directly with the selected MCA. In cases where none of the MCAs 114A-N can respond positively, then the MCAMM 224 can inform the MCSMM 214 of its corresponding MCS 210 to reject the EP's request.

More information on the operation an MCA 220 is disclosed below in conjunction with FIG. 4.

Figure 3:
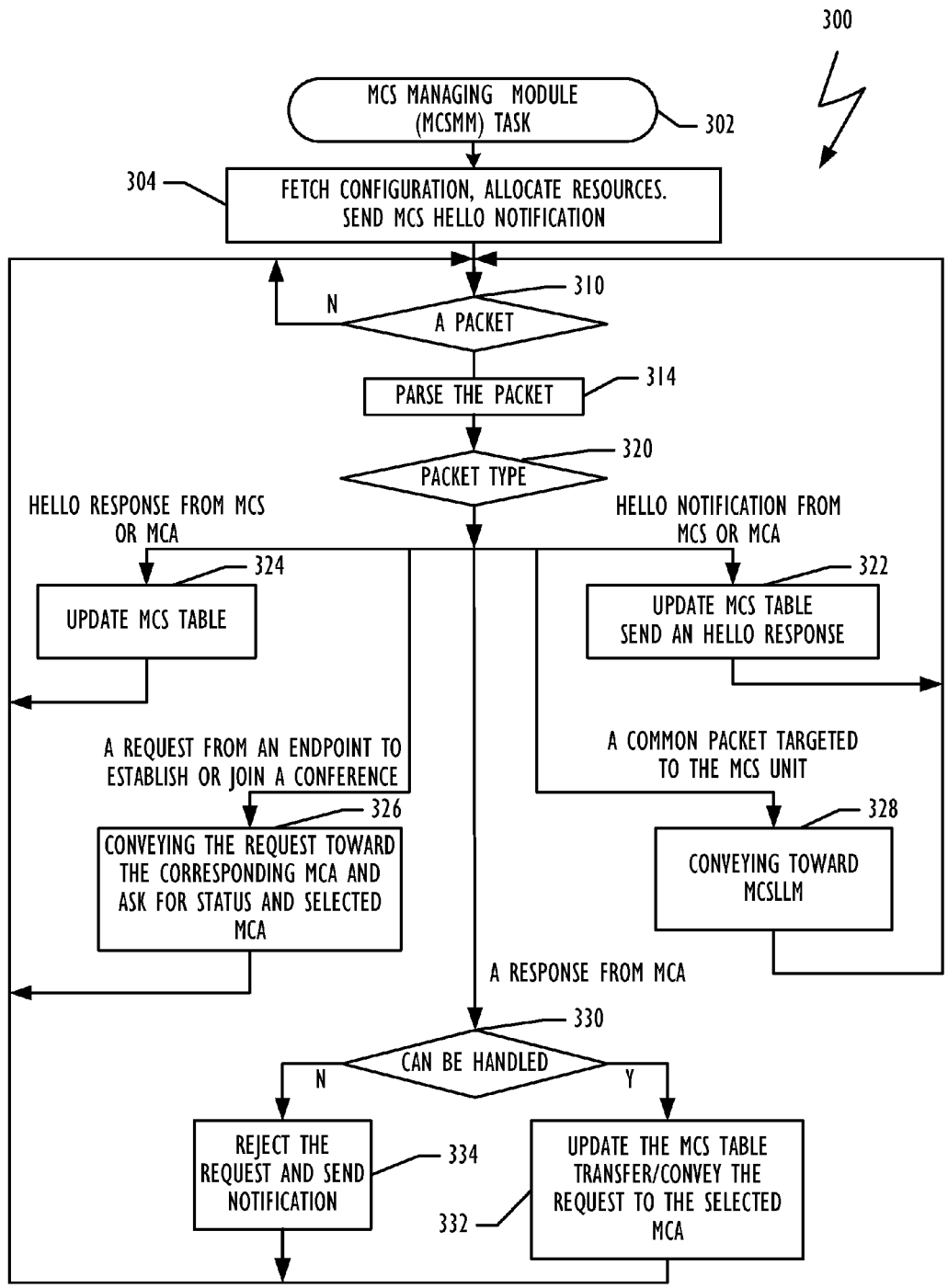
FIG. 3 is a flowchart illustrating relevant actions of a method that can be implemented by an MCS module.

FIG. 3 illustrates a flowchart with relevant actions of an example process 300 that can be executed by a MCSMM 214 in a mesh architecture of a plurality of MCSes 112A-N, MCAs 114A-N and MPs 116A-N. For convenience and clarity of presentation, a similar method for primary-secondary architecture is not illustrated. However, a person with ordinary skill in the art after reading the below description with the remarks that are related to primary-secondary architecture will be able to modify the actions of method 300 in order to adapt them to operate in a primary-secondary architecture.

Process 300 can be initiated in block 302 after turning on the MCS 210 and can be implemented as long as MCS 210 is active. At block 304, resources for handling the MCS table 216 and the MCSLLM 212 can be allocated. Next, the configuration of the videoconferencing system can be fetched. The configuration may comprise the architecture of the conferencing system, pointing on a corresponding MCA, capabilities, etc.

Based on the configuration an MCS Hello notification can be sent in block 304. The MCS Hello notification can include the address of the relevant MCS with or without its available resources. In a mesh architecture, an MCS Hello notification can be sent, and in a primary-secondary architecture an MCS1 Hello notification or an MCS2 Hello notification can be sent according to the state of the MCS. After sending the Hello notification, MCSMM 214 may check its queue in block 310 for a next packet. If a packet exists, the process 300 can fetch the packet and proceed to block 314; if not, process 300 may wait at block 310 until a packet is received. In some embodiments, a timeout mechanism may be used.

After parsing the packet in block 314, the type of the packet is analyzed in block 320 and accordingly one of a plurality of alternatives can be selected. If the packet carries a Hello notification from one of the other MCSes 112A-N, MCAs 114A-N, or MPs 116A-N, then at block 322 the MCS table 216 can be updated with the address, which can be an IP address, of the sending entity. In some embodiments, available resources may be added to the Hello notification. In those embodiments, the resources can be written in the relevant columns of that entry in the table. In a primary-secondary architecture, the notification can include the state of the sending entity, including whether it is a primary or a secondary entity. After storing the relevant information in the MCS table 216 in block 322, the MCSMM 214 can prepare an MCS Hello response and send it via MCSNIF 218 to the entity that sent the Hello notification. The response can comprise the address (IP address, for example) of that MCS with or without information on the available resources. In a primary-secondary configuration, the state of the MCS can be added to the response, for example. Next, process 300 can return to block 310 for handling the next packet in the queue.

If the packet carries a Hello response from one of the other MCSes 112A-N, MCAs 114A-N, or MPs 116A-N, then at block 324 the MCS table 216 can be updated with the address, which can be an IP address, of the responding entity. In some embodiments, available resources may be added to the response. In those embodiments, the resources can be written in the relevant columns of that entry in the table. In a primary-secondary architecture, the response can include the state of the responding entity. Next, process 300 can return to block 310 for handling the next packet in the queue.

In some embodiments, the MCS table 216 is not used. In those embodiments, the Hello notification may not be used in block 304. Instead, MCSMM 214 can be configured to broadcast or multicast requests for information that are related to a current obtained request from an EP to join or establish a videoconferencing session. In other embodiments, the request can be transferred toward the corresponding MCA, which can broadcast and/or multicast the request for information. The request for information can comprise a question if a certain conference is already managed by one of the other entities. The user request can be responded to accordingly.

If in block 320 the packet carries a signaling and control packet that is related to an on-going video conferencing session, then at block 328 the MCS table 216 can be searched based on a session identifier field or IP address, looking for the MCSLLM 212A-K that was allocated for that session. Next, the packet is conveyed toward that MCSLLM 212A-K and process 300 can return to block 310 for handling the next packet in the queue.

If in block 320 the packet carries a request from an EP to establish a videoconferencing session or to join an existing video conferencing session, then at block 326 the packet is conveyed toward the MCAMM 224 of the corresponding MCA 114 and process 300 can return to block 310 for handling the next packet in the queue.

If in block 320 the packet carries a response from the corresponding MCA, then at block 330 a decision is made whether the EP request can be handled by the system 100 of MCUs. If in block 330 there are not enough resources to handle the request, then the request can be rejected and an appropriate message can be sent in block 334 toward the relevant EP via MCSNIF 218 and process 300 can return to block 310 for handling the next packet in the queue. If in block 330 there are enough resources to handle the request, then at block 332, based on the MCA response, the MCS can respond to the requesting EP by few alternatives. If the corresponding MCA is selected to handle the request, then in block 332 the MCS table can be searched for an already allocated MCSLLM 212 for that session. If an already allocated MCSLLM 212A-K was not found, then a new one can be allocated in block 332 to the new session. The entry can be updated. Next, a positive response can be sent toward the requesting EP and process 300 can return to block 310 looking for the next packet in the queue.

If in block 330 the selected MCA is not the corresponding MCA, then in some embodiments, the MCS may instruct in block 332 the requesting EP to forward the call to the MCS that is corresponded with a selected MCA. The call forward instruction can be associated with the IP addresses of the selected MCS. Other embodiments of MCS 210 may remain connecting to the requesting EP and operate in a similar way to back-to-back operation with the selected MCS that corresponds to the selected MCA. In other embodiments, the MCS may operate as a proxy. In those embodiments, the MCS table can be updated in order to reflect the selected MCS. In alternate embodiments, the MCS may remain connected to the requesting EP and communicate directly with the selected MCA. In such embodiments, the MCS table 216 can also be updated in order to reflect the selected MCS. Next process 300 returns to block 304 for handling the next packet in the queue.

In some embodiments, the MCS 210 can be configured to communicate directly with the other MCSes 112A-N while looking for another MCS 112 that can handle the EP 120A-N request. In other embodiments, the receiving MCS 210 may multicast the request to one or more other MCSes 112A-N, looking for an MCS 210 that can handle the call.

In primary-secondary architectures, MCS 1 may be configured to execute actions such as described in blocks 326, 330, 332, and 334. The MCS2 may be configured to instruct calling EPs to forward the call toward the MCS 1. In other embodiments, MCS2 can be configured to route the EP's request toward the MCS1 as an intermediate node.

Figure 4:
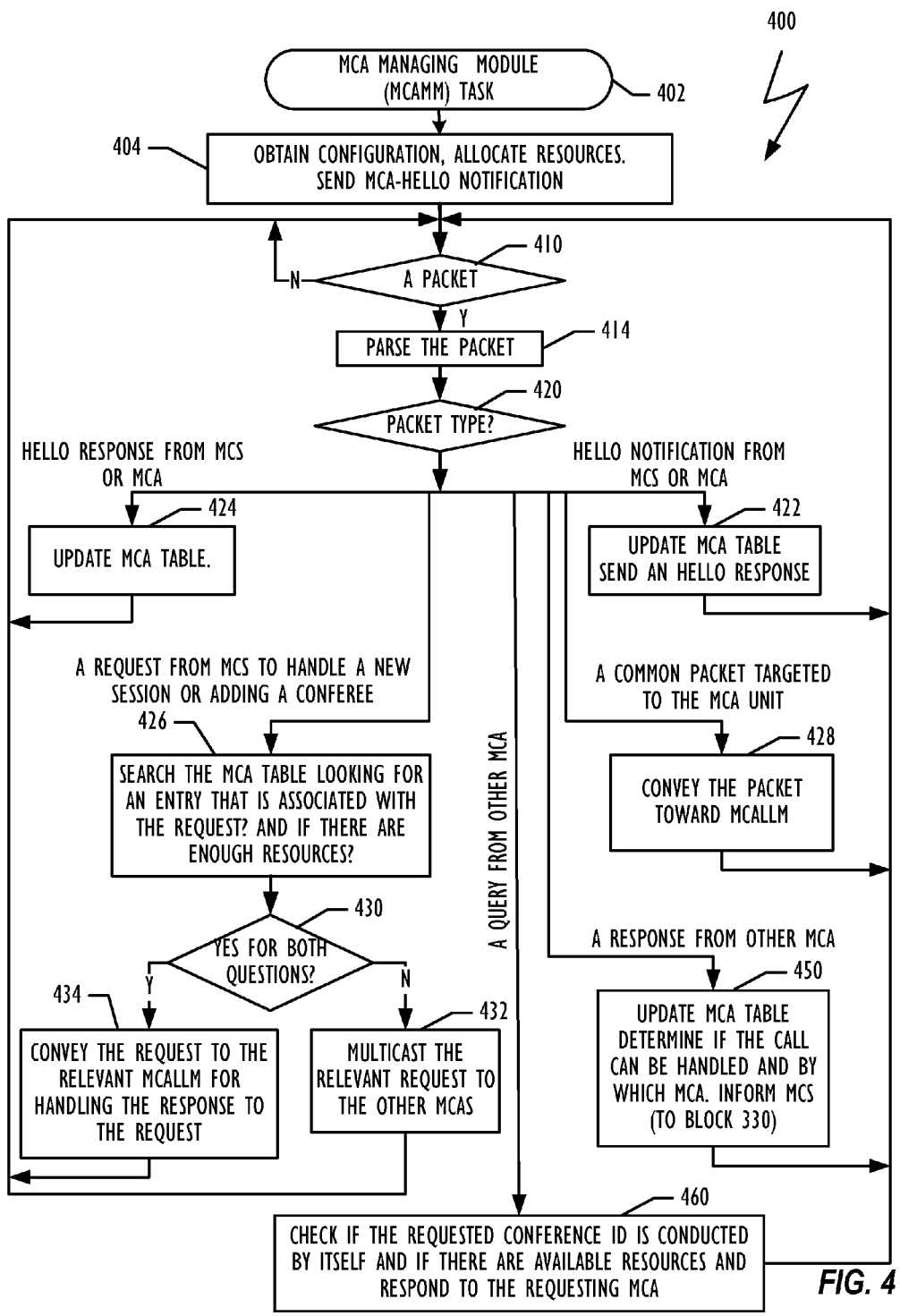
FIG. 4 is a flowchart illustrating relevant actions of a method that can be implemented by an MCA module.

FIG. 4 illustrates a flowchart with relevant actions of a process 400 that can be executed by MCAMM 224 in a mesh architecture of a plurality of MCSes 112A-N, MCAs 114A-N, and MPs 116A-N. For convenience and clarity of presentation, a similar method for primary-secondary architecture is not illustrated. However, a person with ordinary skill in the art, after reading the description below with the associated notes that are related to primary-secondary architecture will be able to adapt method 400 in order to operate in a primary-secondary architecture.

Process 400 can be initiated in block 402 after turning on the MCA 220 and can be implemented as long as MCA 220 is active. At block 404, resources for handling the MCA table 226 and MCALLM 222 can be allocated. Next, the configuration of the videoconferencing group of MCSes, MCAs, and MPs can be fetched. The configuration may comprise the architecture of the conferencing system, pointing to a corresponding MCA, capabilities, etc.

Based on the configuration a Hello notification can be sent in block 404. The Hello notification can include the address of the relevant MCA with or without its available resources. In a mesh architecture, an MCA Hello notification can be sent; in a primary-secondary architecture, an MCA1 Hello notification or an MCA2 Hello notification, according to the state of the corresponding MCS. After sending the MCA Hello notification, MCAMM 224 may check its queue for a next packet in block 410. If a packet exists, then the process 400 can fetch the packet and proceed to block 414; if not, process 400 may wait in block 410 until receiving a packet.

After parsing the packet in block 414, the type of the packet is analyzed in block 420 and accordingly one of a plurality of alternatives can be selected. If the packet carries a Hello notification from one of the other MCAs 114A-N, MCSes 112A-N, or MPs 116A-N, then at block 422 the MCA table 226 can be updated with the address of the sending entity, which can be an IP address. In some embodiments, available resources may be added to the Hello notification. In those embodiments, the resources can be written in the relevant columns of that entry in the table. In a primary-secondary architecture, the notification can include the state of the sending entity, a primary or a secondary entity. After storing the relevant information in the MCA table 226 in block 422, MCAMM 224 can prepare an MCA hello response and send it via MCANIF 228 to the entity that sent the Hello notification. The response can comprise the address (IP address, for example) of that MCA with or without information on the available resources. In a primary-secondary configuration, the state of the MCA can be added to the response. Next, process 400 can return to block 410 for handling the next packet in the queue.

If in block 420 the packet carries a Hello response from one of the other MCAs 114A-N, MCSes 112A-N, or MPs 116A-N, then at block 424 the MCA table 226 can be updated with the address of the responding entity, which can be an IP address. In some embodiments, available resources may be added to the response. In those embodiments, the resources can be written in the relevant columns of that entry in the table. In primary-secondary architecture, the response can include the state of the responding entity. Next, process 400 can return to block 410 for handling the next packet in the queue.

In some embodiments, the MCA table 226 is not used. In those embodiments, the Hello notification and Hello responses may not be used. Instead, MCAMM 224 can be configured to broadcast/multicast requests for information that is related to a currently obtained request from an EP. In other embodiments, the request can be obtained from the corresponding MCS. The request for information can comprise a question whether a certain conference is already managed by one of the other entities. The user request can be responded to accordingly.

If in block 420 the packet carries a videoconferencing application packet that is related to an on-going video conferencing session, then at block 428 the MCA table 226 can be searched, based on a session identifier field or IP address, looking for the MCALLM 222A-P that was allocated for that session. An example of videoconferencing application packet can be a packet that carries layout decisions, selecting a presented conferee, etc. Next, the packet is conveyed toward that MCALLM 222A-P and process 400 can return to block 410 for handling the next packet in the queue.

If in block 420 the packet is a packet that was transferred, at block 326, from the corresponding MCS and the packet carries a request from an EP to establish a videoconferencing session or to join an existing video conferencing session, then at block 426 the MCA table is searched looking for an entry that is associated with the request and for available resources for handling the request. If in block 430 an entry in MCA table is found and if there are enough resources, then the entry is updated in block 434; the corresponding MCS can be informed that the request can be handled by that pair of MCS 210 and MCA 220; the packet is conveyed in block 434 toward the relevant MCAMM 224 for further processing; and process 400 can return to block 410 for handling the next packet in the queue.

If in block 430 an entry is not found or there are not enough resources to handle the request, then the user's request can be encapsulated in an MCA multicast/broadcast packet and be transmitted in block 432 to the other MCAs 114A-N for checking if one of them can respond to the request, then process 400 can return to block 410 for handling the next packet in the queue. In some embodiments, a waiting period (WP) timer can be reset. The WP timer can be used in order to terminating the waiting time to responses from the other MCAs to which the request was multicast/broadcast. The WP can be in the range of few seconds, 1-5 seconds, for example.

If in block 420 the packet is a query packet that was broadcast/multicast from another MCA, wherein the another MCA performs block 432 by its own MCAMM 224, the query carries a user's request to join or establishing a videoconferencing session. Then at block 460, the packet is parsed in order to determine the user request. If the request is for joining an existing conference or establishing a new one, then the MCAMM 224 may search the MCA table 226 in block 460 for an entry that is associated with the conference ID. If an entry is found, then the MCAMM 224 may respond in block 460 by informing the requesting MCA about the existing conference and ask to transfer the call toward its corresponding MCS and process 400 returns to block 410.

If the request from another MCA is to join an existing session or to establish a new session, the MCAMM may check the MCA table 226 for its free resources. If there are enough resources to conduct the new session, then the requesting MCA (the another MCA) can be informed about its available resources in block 460 and process 400 returns to block 410. If there are no resources or the existing conference is not conducted by the MCA that executes block 460, then a negative response can be transmitted toward the requesting MCA and process 400 returns to block 410.

If in block 420 the packet carries a response from another MCA that responded to a request that had been sent at block 432 by the MCA that currently executes process 400, then in block 450 the packet is parsed and the MCA table can be updated. After collecting responses from responding MCAs or the timer reaches the WP, then the MCA table can be analyzed in block 450 in order to determine if there are enough resources, in one or more of the MCS 112A-N, MCA 114A-N, MP 116A-N, to respond positively to the user request to join or establishing a new videoconferencing. If there are not enough resources, the MCAMM 224 may inform its corresponding MCS 121A-N to reject the user request in block 450. If there are resources in one of the MCAs, then at block 450 MCAMM 224 may instruct its corresponding MCS to respond to the user request and to establish a new session or join the requesting EP to an existing conference. Alternatively, the MCAMM 224 may instruct its corresponding MCS in block 450 to ask the requesting EP to forward the call toward another MCS that is corresponding with the MCA that has enough resources or that handles the relevant videoconferencing session. Then process 400 can return to block 410. In some embodiments, at block 450 the timer can be stopped.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A videoconferencing control system, the system comprising:
   a multipoint controller signaling layer module, configured to provide signaling services for establishing and conducting a videoconferencing session between two or more videoconferencing endpoints; and
   a plurality of multipoint controller application layer modules, each configured to control the videoconferencing session between the two or more endpoints,
   wherein the videoconferencing session employs the multipoint controller signaling layer module and one or more of the multipoint controller application layer modules.

2. The videoconferencing control system of claim 1, wherein the multipoint controller signaling module is configured to respond to a request from an endpoint to join the videoconferencing session by selecting a multipoint controller application layer module of the plurality of multipoint controller application layer modules for handling the request.

3. The videoconferencing control system of claim 2, wherein the selected multipoint controller application layer module already controls the videoconferencing session.

4. The videoconferencing control system of claim 1, further comprising a plurality of multipoint controller signaling layer modules,
   wherein each multipoint controller signaling layer modules is configured to communicate with each other multipoint controller signaling layer module and each of the multipoint controller application layer modules, and
   wherein each of the multipoint controller application layer modules is configured to communicate with each other multipoint controller application layer module and each of the multipoint controller signaling layer modules.

5. The videoconferencing control system of claim 4, wherein each of the multipoint controller signaling layer modules is associated with a multipoint controller application layer module of the plurality of multipoint controller application layer modules.

6. The videoconferencing control system of claim 4, wherein the plurality of multipoint controller signaling layer modules and at least one of the plurality of multipoint controller application layer modules are assembled as a single entity.

7. The videoconferencing control system of claim 1, wherein the multipoint controller signaling layer module and a multipoint controller application layer module of the plurality of multipoint controller application layer modules are assembled as a single entity.

8. The videoconferencing control system of claim 1, where the multipoint controller signaling layer module and each of the plurality of multipoint controller applications layer modules are individually network addressable.

9. The videoconferencing control system of claim 1, wherein the multipoint controller signaling layer module is configured to respond to a request from an endpoint to join the videoconferencing session by asking a multipoint controller application layer module associated with the multipoint controller signaling layer module to identify another multipoint controller application layer module of the plurality of multipoint controller application layer modules to handle the request from the endpoint.

10. The videoconferencing control system of claim 9, wherein the multipoint controller signaling layer module is further configured to request the endpoint to forward the request to join the videoconferencing session to another multipoint controller signaling layer module that is associated with the identified multipoint controller application layer module.

11. A multipoint controller signaling layer unit, comprising:
    a network interface module that is configured to connect the multipoint controller signaling layer unit with a plurality of videoconferencing endpoints, a plurality of other multipoint controller signaling layer units, and a plurality of multipoint controller application layer units;
    a multipoint controller signaling layer logical module, configured to conduct signaling operations of a videoconferencing session; and
    a multipoint controller signaling layer managing module, configured to respond to a request from an endpoint of the plurality of videoconferencing endpoints to join the videoconferencing session by:
       identifying a second multipoint controller signaling layer unit for handling the request; and
       forwarding the request toward the second multipoint controller signaling layer unit.

12. The multipoint controller signaling layer unit of claim 11, further comprising:
    a multipoint controller signaling layer table, in which is stored a network address of the second multipoint controller signaling layer unit.

13. The multipoint controller signaling layer unit of claim 12, wherein the network interface module is configured to route information to a multipoint controller signaling layer logical module of the second multipoint controller signaling layer unit based on the network address stored in the multipoint controller signaling layer table.

14. The multipoint controller signaling layer unit of claim 11, wherein the multipoint controller signaling layer managing module is further configured to respond to a request from a second endpoint to join the videoconferencing session by:

identifying a third multipoint controller signaling layer unit for handling the request from the second endpoint; and forwarding the request from the second endpoint to the third multipoint controller signaling layer unit.

15. The multipoint controller signaling layer unit of claim 11, wherein the multipoint controller signaling layer unit is further configured to respond to the request by:

forwarding signaling and control information to a multipoint controller signaling layer managing module of the second multipoint controller signaling layer unit.

16. The multipoint controller signaling layer unit of claim 11, wherein the multipoint controller signaling layer unit is configured as a primary multipoint controller signaling layer unit and the second multipoint controller signaling layer unit is configured as a secondary multipoint controller signaling layer unit.

17. The multipoint controller signaling layer unit of claim 11, wherein the multipoint controller signaling layer logical module is created by the multipoint controller signaling layer managing module.

18. A multipoint controller application layer unit, comprising:

a network interface module, configured to connect the multipoint controller application layer unit with a plurality of videoconferencing endpoints, a plurality of other multipoint controller application layer units, a plurality of multipoint controller signaling layer units, and a plurality of multipoint processors;

a multipoint controller application layer logical module, configured to conduct and control an ongoing video conferencing session; and a multipoint controller application layer managing module, configured to respond to a request from a multipoint controller signaling layer unit regarding a request by an endpoint of the plurality of videoconferencing endpoints to join the videoconferencing session by:

identifying a second multipoint controller application layer unit capable of handling the request; and informing the requesting multipoint controller signaling layer unit of the second multipoint controller application layer unit.

19. The multipoint controller application layer unit of claim 18, further comprising:

a multipoint controller application layer table, in which is stored a network address of the second multipoint controller application layer unit.

20. The multipoint controller application layer unit of claim 19, wherein the network interface module is configured to route information to a multipoint controller application layer logical module of the second multipoint controller application layer unit based on the network address stored in the multipoint controller application layer table.

* * * * *